US012434361B2

(12) United States Patent
Meyers et al.

(10) Patent No.: US 12,434,361 B2
(45) Date of Patent: Oct. 7, 2025

(54) PIPE MOUNTING DEVICE

(71) Applicant: EBBE AMERICA, LC, Clearfield, UT (US)

(72) Inventors: Lawrence G. Meyers, Clearfield, UT (US); Alden S. Meyers, Clearfield, UT (US)

(73) Assignee: EBBE AMERICA, LC, Clearfield, UT (US)

( * ) Notice: Subject to any disclaimer, the term of this patent is extended or adjusted under 35 U.S.C. 154(b) by 0 days.

(21) Appl. No.: 16/922,696

(22) Filed: Jul. 7, 2020

(65) Prior Publication Data

US 2021/0008700 A1 Jan. 14, 2021

Related U.S. Application Data

(60) Provisional application No. 62/872,363, filed on Jul. 10, 2019.

(51) Int. Cl.
*B25B 27/00* (2006.01)
*B25B 27/02* (2006.01)
*E03F 5/04* (2006.01)

(52) U.S. Cl.
CPC .............. *B25B 27/02* (2013.01); *E03F 5/041* (2013.01)

(58) Field of Classification Search
CPC .. B66C 1/442; B66C 1/42; B66C 1/66; B66C 1/62; B66C 1/44; B66F 15/80; B66F 15/00; B66F 19/00; B66F 2700/00; B66F 2700/09; E03F 5/041; B25B 27/02; B25B 27/00; B25B 27/06; B25B 27/10
USPC ........ 29/92, 278, 266, 255, 235; 254/19, 21, 254/25; 294/92
See application file for complete search history.

(56) References Cited

U.S. PATENT DOCUMENTS

| | | | | | |
|---|---|---|---|---|---|
| 2,409,932 | A * | 10/1946 | Dostal | E04G 21/162 294/92 |
| 3,447,228 | A * | 6/1969 | Knickerbocker | B25B 27/02 29/280 |
| 3,691,612 | A * | 9/1972 | Layne | B25B 27/062 29/266 |
| 7,048,643 | B2 * | 5/2006 | Welsh | A63B 60/34 473/294 |
| 7,143,491 | B2 * | 12/2006 | Wood | B25B 27/04 81/3.27 |
| 7,682,102 | B1 * | 3/2010 | Burke | E01C 19/35 404/133.05 |
| D1,033,580 | S * | 7/2024 | Andrews | D21/759 |

(Continued)

FOREIGN PATENT DOCUMENTS

CN 207980336 U * 10/2018

OTHER PUBLICATIONS

Machine Translation CN 207980336 (Year: 2018).*

*Primary Examiner* — Lee D Wilson
(74) *Attorney, Agent, or Firm* — Workman Nydegger

(57) ABSTRACT

A pipe mounting device includes an elongate part and a mounting head attached to a first end of the elongate part. The mounting head is sized and configured for positioning within a pipe end. The pipe mounting device is movable via the elongate part between a first position in which the mounting head is passable through an inner diameter of the pipe end along a length, and a second position in which the mounting head lockingly engages with the inner diameter of the pipe end and is usable to secure a position of the pipe end below a subfloor.

15 Claims, 7 Drawing Sheets

(56) References Cited

U.S. PATENT DOCUMENTS

| | | | | |
|---|---|---|---|---|
| 2007/0238548 | A1* | 10/2007 | Johnson | A63B 53/02 473/340 |
| 2010/0133864 | A1* | 6/2010 | Syse | F16L 55/1283 294/92 |
| 2011/0281666 | A1* | 11/2011 | Hair | A63B 53/0487 473/340 |
| 2012/0124724 | A1* | 5/2012 | LaPointe | E03C 1/186 4/295 |
| 2016/0271787 | A1* | 9/2016 | Sakmar, III | B25G 1/125 |
| 2018/0050745 | A1* | 2/2018 | Bewley | F21S 9/02 |
| 2021/0008700 | A1* | 1/2021 | Meyers | B25B 5/147 |

* cited by examiner

PIPE MOUNTING DEVICE

TECHNICAL FIELD

The disclosure relates to a pipe mounting device for assisting in the installation of plumbing fixtures.

BACKGROUND

A floor drain in its simplest form is a drain body or structure which will funnel liquids from the top of a floor to a drain pipe. Typically, these floor drains have a drain grate attached to the top thereof to allow liquid to flow therethrough but to prevent larger solid objects from entering the drain pipe.

A problem associated with the construction of floor drains is one of attaching the drain body to the drain pipe. Because the drain pipe is often located within a cutout in a subfloor (e.g., a wood subfloor or a concrete subfloor), the drain pipe is notoriously difficult to access and/or stabilize during installation of the drain body. As such, attaching the drain body to the drain pipe can be challenging because the drain pipe commonly moves below the subfloor when the installer attempts to push the drain body onto the drain pipe through the cutout. For example, as the installer attempts to push the drain body onto the end of the drain pipe, the drain pipe may move or flex away from the installer such that the drain pipe is not fully inserted into the drain body, which, in turn, can result in water damage due to a leaky connection between the drain pipe and the drain body. Further, the drain pipe often does not conform precisely to and is not in perfect alignment with the cutout in the subfloor.

Accordingly, there is a need for a pipe mounting device that incorporates certain design improvements for streamlined and improved installation of a floor drain.

SUMMARY

Embodiments of the present disclosure help provide streamlined and improved installation of a drain system or other plumbing fixture. According to an embodiment, a pipe mounting device includes an elongate part and a mounting head attached to a first end of the elongate part. The mounting head is sized and configured for positioning within a pipe end. The pipe mounting device is movable via the elongate part between a first position in which the mounting head is passable through an inner diameter of the pipe end along a length, and a second position in which the mounting head lockingly engages with the inner diameter of the pipe end and usable to secure a position of the pipe end below a subfloor.

According to a variation, the mounting head is sized and configured to selectively mount the pipe mounting device to the internal diameter of a pipe end or fitting. For instance, the pipe mounting device can be movable between the first position and the second position. The pipe mounting device in the second position allows a user to easily access and set or maintain the position of the pipe end, for example, during the attachment of a drain body of a floor drain system to the pipe end, which, in turn, facilitates installation of the floor drain system. In an embodiment, rotating and/or tilting the mounting head 104 within the pipe end via the elongate part moves the pipe mounting device between the first position and the second position. This streamlined design allows the pipe mounting device to be easily employed in many different applications.

According to a variation, the mounting head can be formed of a material that is harder than the pipe end such that the pipe end slightly flexes to accommodate the mounting head in the second position, creating a friction of press fit between the mounting head and the pipe end. For instance, the mounting head can be formed of a steel material and the pipe end can comprise a plastic pipe (e.g., polyvinyl chloride (PVC) and acrylonitrile butadiene styrene (ABS)). Further, the size of the mounting head can be selected to exert enough force against the inner diameter of the pipe end to lock the mounting head in the pipe end without exerting too much force or pressure that could damage or crack the pipe end.

Because the elongate part defines a moment arm and provides the user a point of control above the subfloor, it can provide both a mechanical and use advantage, requiring less strength or dexterity to move the pipe mounting device between the first position and the second position. This is beneficial over known mounting systems such as bolts, screws, or tools which require complex levels of manual dexterity and workable access below the subfloor, making their use difficult and intimidating for many users. Moreover, unlike known systems, the pipe mounting device can mount to the pipe end without disrupting the outer diameter of the pipe end and with minimal or no damage to the inner diameter of the pipe end.

BRIEF DESCRIPTION OF THE DRAWINGS

These and other features, aspects, and advantages of the present disclosure will become better understood regarding the following description, appended claims, and accompanying drawings.

Figure 1:
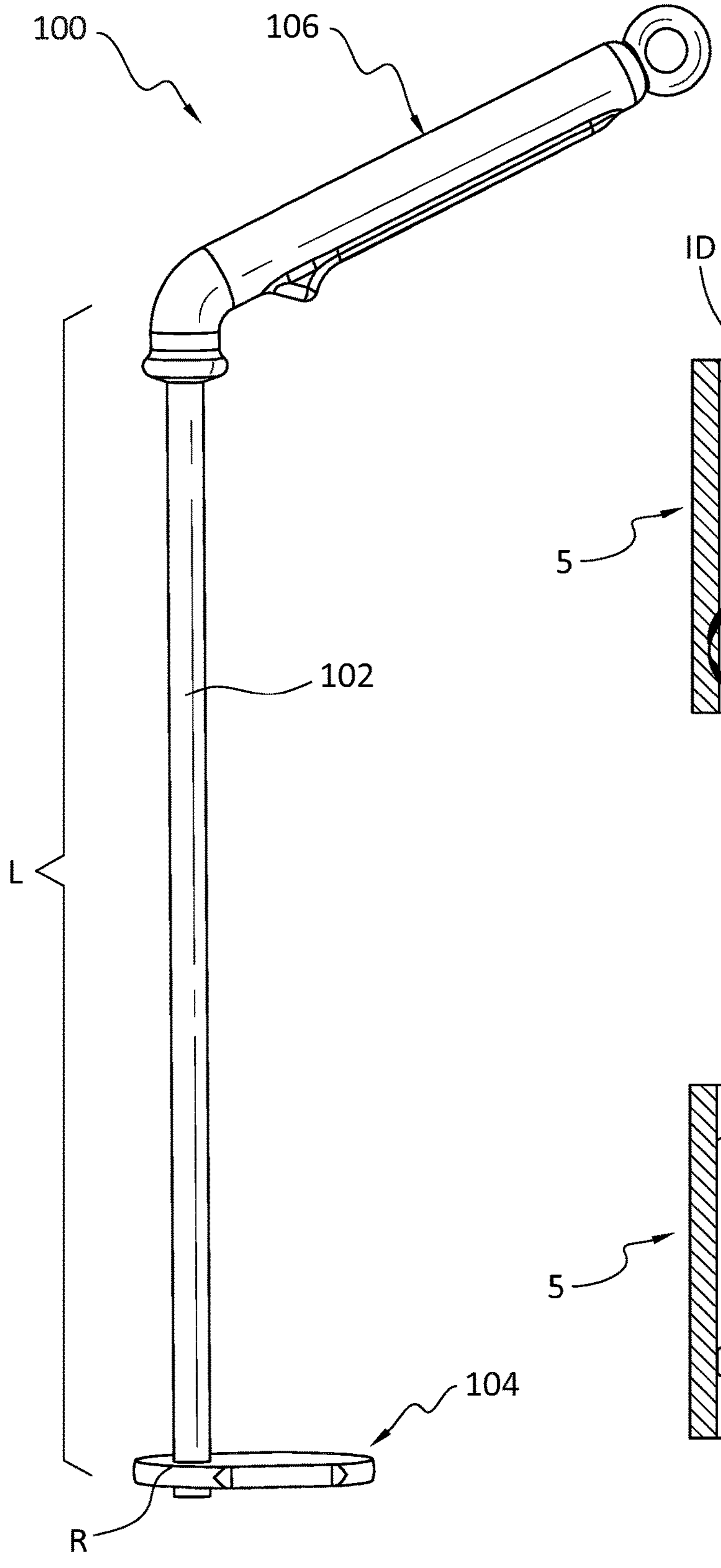
FIG. 1 is a side view of a pipe mounting device according to an embodiment.

The drawing figures are not necessarily drawn to scale, but instead are drawn to provide a better understanding of the components, and are not intended to be limiting in scope, but to provide exemplary illustrations. The figures illustrate exemplary configurations of drain systems, and in no way limit the structures or configurations of a drain system and components according to the present disclosure.

DETAILED DESCRIPTION OF VARIOUS EMBODIMENTS

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. It should be understood, however, there is no intention to limit the disclosure to the specific embodiments disclosed, but on the contrary, the intention covers all modifications, alternative constructions, combinations, and equivalents falling within the spirit and scope of the disclosure.

It will be understood that unless a term is expressly defined in this application to possess a described meaning, there is no intent to limit the meaning of such term, either expressly or indirectly, beyond its plain or ordinary meaning.

Embodiments of the present disclosure help provide streamlined and improved installation of a drain system or other plumbing fixture. According to a variation, a pipe mounting system includes a pipe mounting device 100 comprising an elongate part 102 and a mounting head 104 connected at or near a first end of the elongate part 102 and arranged to selectively mount the pipe mounting device 100 to an internal diameter of a drain pipe. While a drain pipe is described, it will be appreciated that the pipe mounting device 100 can be configured for use with any suitable pipe end or pipe fitting.

In an embodiment, the mounting head 104 is attached to the elongate part 102 via a weld or other mechanical attachment. In other embodiments, the mounting head 104 can be removably attached to the elongate part 102. For instance, the mounting head 104 can be threadedly attached to the lower end of the elongate part 102 and interchangeable with different mounting heads configured for pipes of different sizes and/or materials. In other embodiments, the mounting head 104 can be integral to the elongate part 102. As discussed in more detail below, the connection between the elongate part 102 and the mounting head 104 can be offset from an outer periphery of the mounting head 104. This helps create a clearance between the elongate part 102 and an inner diameter, ID, or wall of the drain pipe, facilitating operation of the pipe mounting device 100 when the pipe mounting device 100 is inserted in a pipe or drain pipe. Optionally, a grip portion 106 can be connected to the elongate part 102 at or near a second end opposite the first end. In the illustrated embodiment, the grip portion 106 can comprise a handle member having an ergonomic shape that allows a user to easily grip the elongate part 102, facilitating operation of the pipe mounting device 100.

The elongate part 102 is shown as a rod member but can comprise any suitable member. The elongate part 102 can have a strength and stiffness configured to resist a bending moment and/or twisting in the elongate part 102. The elongate part 102 can be linear, angled, curved, or combinations thereof.

Figure 1A:
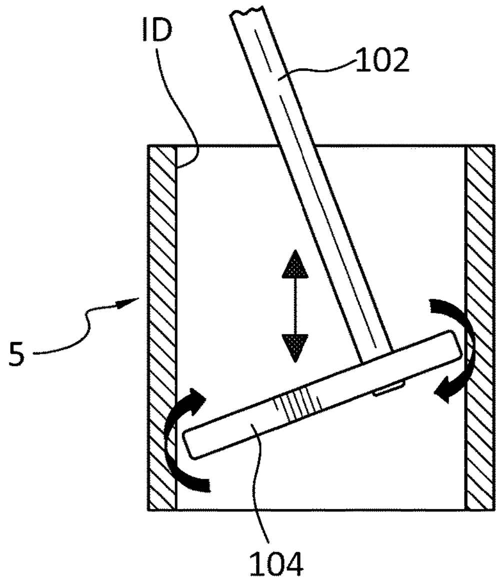
FIGS. 1A and 1B are schematic views of the pipe mounting device in FIG. 1 in different positions inside a pipe.
Figure 1B:
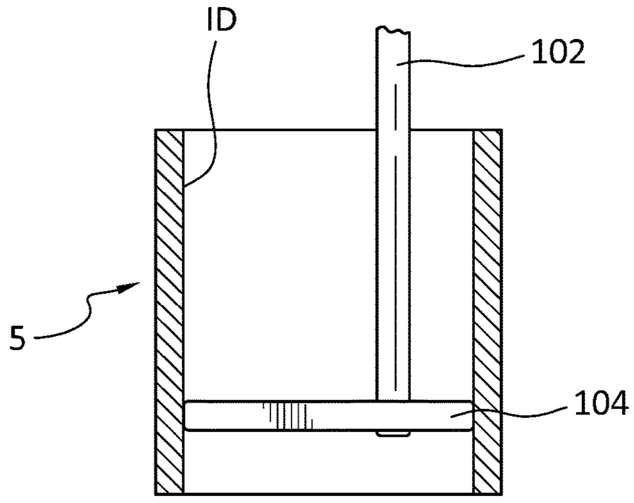

Referring to FIGS. 1A and 1B, the mounting head 104 is sized and configured to selectively mount the pipe mounting device 100 to the internal diameter of a pipe end 5 or fitting. For instance, the pipe mounting device 100 can be movable between a first position (shown in FIG. 1A) in which the mounting head 104 is positionable within and passable through an inner diameter of the pipe end 5, and a second position (shown in FIG. 1B) in which the mounting head 104 lockingly engages with the inner diameter of the pipe end 5. The pipe mounting device 100 in the second position allows a user to easily access and set or maintain the position of the pipe end 5, for example, during the attachment of a drain body of a floor drain system to the pipe end 5, which, in turn, facilitates installation of the floor drain system. In an embodiment, rotating and/or tilting the mounting head 104 within the pipe end 5 via the elongate part 102 moves the pipe mounting device 100 between the first position and the second position. Such a streamlined design allows the pipe mounting device 100 to be easily employed in many different applications.

According to a variation, the mounting head 104 can be formed of a material that is harder than the pipe end 5 such that the pipe end 5 slightly flexes to accommodate the mounting head 104 in the second position, creating a friction of press fit between the mounting head 104 and the pipe end 5. For instance, the mounting head 104 can be formed of a steel material and the pipe end 5 can comprise a plastic pipe (e.g., PVC) and ABS). Further, the size of the mounting head 104 is selected to exert enough force against the inner diameter of the pipe end 5 to lock the mounting head 104 in the pipe end 5 without exerting too much force or pressure that could damage or crack the pipe end 5. In other embodiments, at least a portion of the outer periphery of the mounting head 104 can include a material arranged to resiliently conform to the shape of the inner diameter of the pipe end 5 when the mounting head 104 is in the second position, creating a friction or compression fit between the mounting head 104 and the pipe end 5. It will be appreciated that the pipe end 5 can have different sizes based on the site or plumbing requirements. For instance, the pipe end 5 can be 1½-inch diameter, 2-inch diameter, 3-inch diameter, or any other suitable pipe size.

Figure 2A:
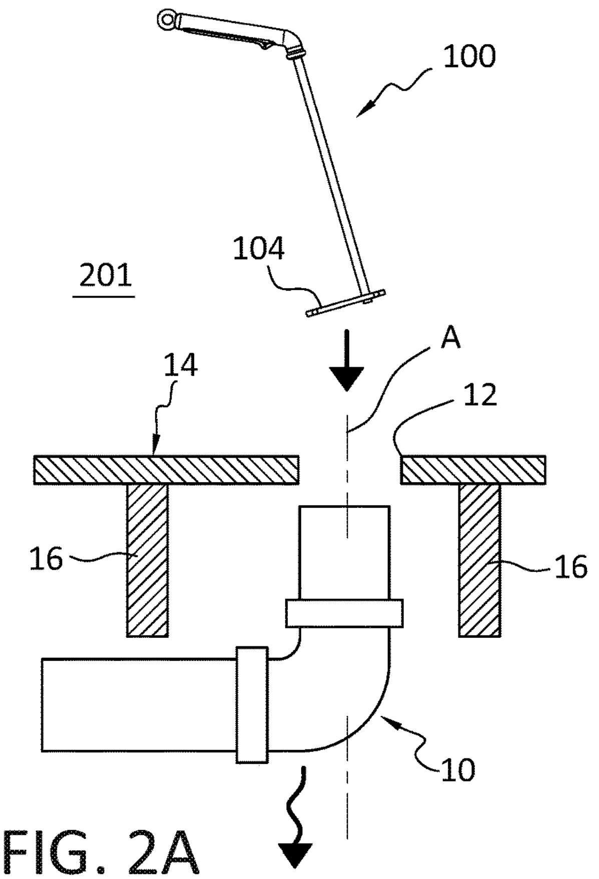
FIG. 2A-2D is an overview of the steps in an embodiment of a plumbing fixture installation method using the pipe mounting device in FIG. 1.

One exemplary implementation of the pipe mounting device 100 according to an embodiment will now be described in reference to FIGS. 2A-2D. A step 201 can include positioning the pipe mounting device 100 within a pipe end comprising a drain pipe 10. This can include positioning the pipe mounting device 100 within the drain pipe 10 via a cutout 12 formed in a subfloor 14. The drain pipe 10 can comprise a drain pipe attached to a plumbing fitting (e.g., an elbow or a trap) located below the subfloor 14 and alongside a joist 16 or between adjacent joists 16. In the illustrated embodiment, the drain pipe 10 extends in a downward direction below the subfloor 14 between the adjacent joists 16 and in a horizontal direction below at least one of the joists 16. As such, when the drain pipe 10 is loaded, it may undesirably flex or move below the subfloor 14 as shown in FIG. 2A.

In an embodiment, the pipe mounting device 100 is positioned within the drain pipe 10 in a first position in which the mounting head 104 can move a distance through an opening of the drain pipe 10. According to a variation, the mounting head 104 is obliquely oriented relative to a longitudinal axis A of the drain pipe 10 in the first position (shown in FIG. 2B).

Figure 2B:
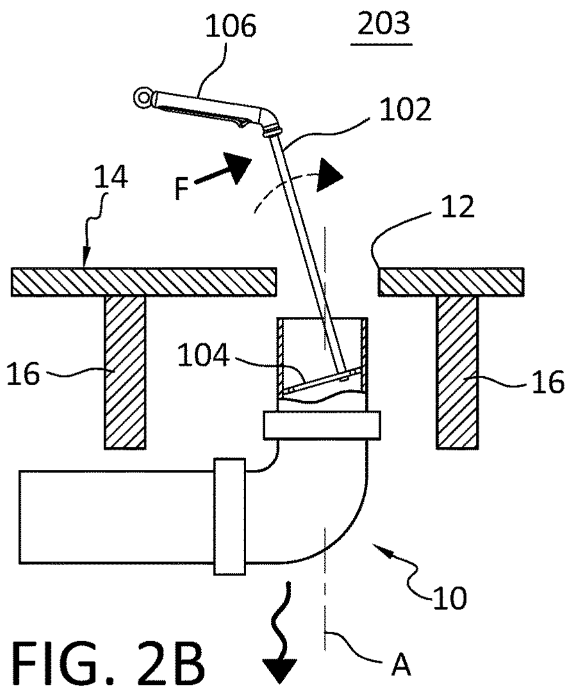

A step 203 can include moving the pipe mounting device 100 from the first position to a second position with the pipe mounting device 100 positioned inside the drain pipe 10 as shown in FIG. 2B. In the second position, the mounting head 104 of the pipe mounting device 100 lockingly engages with the inner diameter of the drain pipe 10 (shown in FIG. 2C) such that the pipe mounting device 100 is selectively locked or mounted together with the drain pipe 10. This advantageously allows a user to maneuver or manipulate the pipe mounting device 100 via the elongate part 102 and/or grip portion 106 above the subfloor 14 to set or maintain the position of the drain pipe 10 in relation to the subfloor 14. For instance, with the pipe mounting device 100 in the second position inside the drain pipe 10, the user can adjust the lateral and/or vertical position of the drain pipe 10 in relation to the cutout 12 in the subfloor 14. In an embodiment, the mounting head 104 is oriented substantially normal to the longitudinal axis A of the drain pipe 10 when the pipe mounting device 100 is in the second position (shown in FIG. 2C).

The elongate part 102 of the pipe mounting device 100 is sized and configured to provide a user various advantages to move the pipe mounting device 100 between the first and second positions. For instance, the elongate part 102 can form a lever defining a length L (shown in FIG. 1) that is rotatable about a rotation axis R (shown in FIG. 1) located at or near the connection between the mounting head 104 and the elongate part 102. In use, a force F applied to the grip portion 106 or toward the second end of the elongate part 102 above the subfloor 14 rotates the elongate part 102 and the mounting head 104 in a first direction (e.g., clockwise) about the rotation axis R from the first position to the second position, which, in turn, forces one or more working surfaces on the mounting head 104 into locking engagement with the inner diameter of the drain pipe 10.

Because the elongate part 102 defines a moment arm and provides the user a point of control above the subfloor 14, it provides both a mechanical and use advantage, requiring less strength or dexterity to move the pipe mounting device 100 between the first position and the second position. This is beneficial over known mounting systems such as bolts, screws, or tools which require complex levels of manual dexterity and workable access below the subfloor 14, making their use difficult and intimidating for many users. Moreover, unlike known systems, the pipe mounting device 100 can mount to the drain pipe 10 without disrupting the outer diameter of the drain pipe 10 and with minimal or no damage to the inner diameter of the drain pipe 10.

Figure 2C:
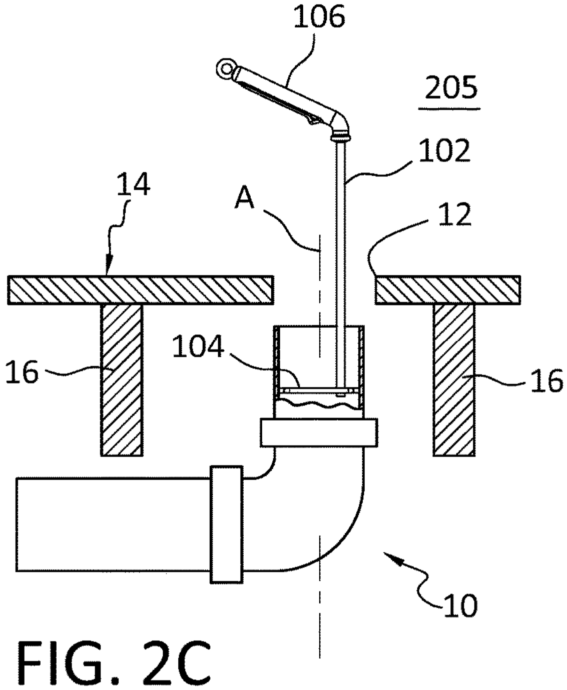

With the pipe mounting device 100 in the second position as shown in FIG. 2C, a step 205 can include attaching a plumbing fixture to the drain pipe 10. The plumbing fixture is shown as a drain body 18 but can comprise any suitable drain fixture. In an embodiment, step 205 includes controlling a vertical position of the drain pipe 10 using the pipe mounting device 100 such that undesirable vertical movement of the drain pipe 10 relative to the subfloor 14 is limited or prevented. Controlling the vertical position of the drain pipe 10 can include fixing or maintaining the vertical position of the drain pipe 10. In other embodiments, controlling the vertical position of the drain pipe 10 can include pulling or forcing the drain pipe 10 upwardly into engagement with the drain body 18 using the pipe mounting device 100. Optionally, step 205 includes controlling a lateral position of the drain pipe 10 within the cutout 12 using the pipe mounting device 100 such that the drain pipe 10 is suitably positioned to interface with the drain body 18 extending through the cutout 12.

According to a variation, step 205 can include loading the drain body 18 onto the pipe mounting device 100. For instance, step 205 can include loading the drain body 18 onto and over the grip portion 106 and moving the drain body 18 along the elongate part 102 until it can sealingly attach to the drain pipe 10. In an embodiment, a flange 20 supports the drain body 18 in the cutout 12 on the subfloor and provides an attachment surface between the drain body 18 and the subfloor. With the drain body 18 attached to the subfloor 14, a user can use the pipe mounting device 100 in the second position to pull or force the drain pipe 10 upwardly until it is fully or sufficiently inserted in the drain body 18. The pipe mounting device 100 can thus help force the drain pipe 10 and the drain body 18 together, helping to reduce the likelihood of a leaky connection.

In other embodiments, a user can manipulate or use the pipe mounting device 100 to maintain a position of the drain pipe 10 below the subfloor 14 and the drain body 18 can be moved or forced downwardly onto the drain pipe 10 against the resistance provided by the pipe mounting device 100. Either approach advantageously allows the pipe mounting device 100 to limit or eliminate undesirable downward movement of the drain pipe 10 below the subfloor 14 during a floor drain installation. While the drain body 18 is described as being loaded onto the pipe mounting device 100 after the pipe mounting device 100 is positioned in the drain pipe 10, in other embodiments, the drain body 18 can be positioned in the cutout 12 on the subfloor 14 before the pipe mounting device 100 is positioned in the drain pipe 10. For instance, the pipe mounting device 100 can be fed through the drain body 18 into the drain pipe 10. In other embodiments, the drain body 18 can be loaded onto the pipe mounting device 100 before the pipe mounting device is positioned in the drain pipe 10.

It will be appreciated that the drain body 18 can be sealingly attached to the drain pipe 10 in any suitable manner. For example, the drain body 18 can be attached to the drain pipe 10 via an adhesive. In other embodiments, the drain body 18 can be attached to the drain pipe 10 via a compression fitting.

Figure 2D:
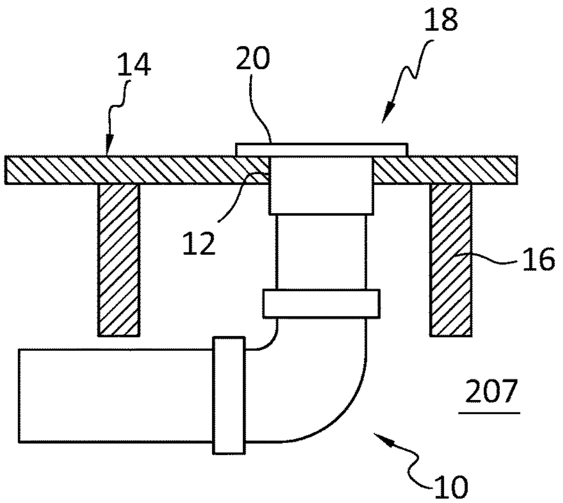

A step 207 can include removing the pipe mounting device 100 from the drain pipe 10 after the drain body 18 is attached to the drain pipe 10. In an embodiment, step 207 includes moving the pipe mounting device 100 from the second position toward the first position, and withdrawing the pipe mounting device 100 from the drain pipe 10 after the drain body 18 is attached to the drain pipe 10. For instance, a force can be applied to the grip portion 106 that rotates the elongate part 102 and the mounting head 104 in a second direction (e.g., counterclockwise) opposite the first direction about the rotation axis R from the second position toward the first position, which, in turn, forces the one or more working surfaces on the mounting head 104 out of locking engagement with the inner diameter of the drain pipe 10. With the pipe mounting device 100 in the first position, the mounting head 104 of the pipe mounting device 100 can be freely removed or retracted from the drain pipe 10, removing the pipe mounting device 100 from the drain pipe 10. Because the drain body 18 is attached to the subfloor 14, the drain body 18 limits or eliminates undesirable movement of the drain pipe 10 after removal of the pipe mounting device 100 as shown in FIG. 2D. The pipe mounting device 100 thus helps provide streamlined and improved installation of a floor drain.

Figure 3:
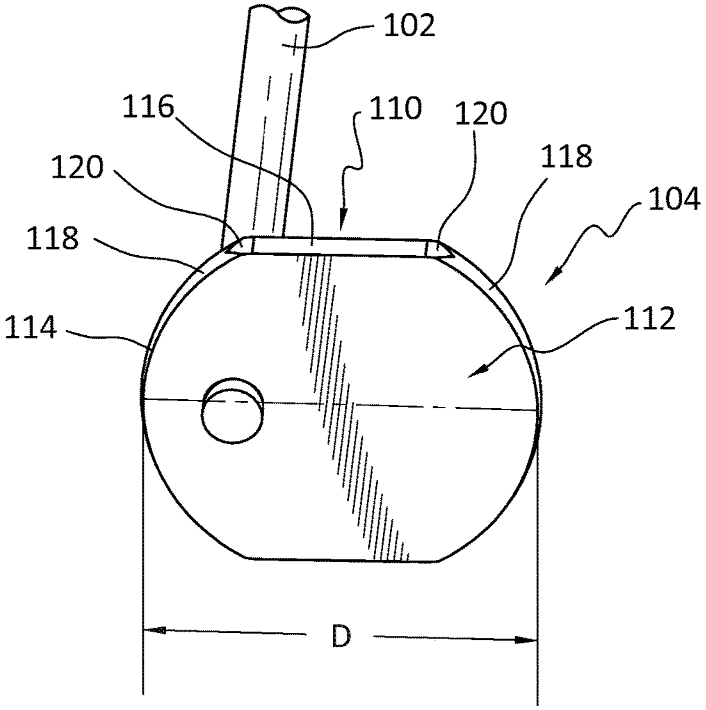
FIG. 3 is a bottom perspective view of the pipe mounting device in FIG. 1.

FIG. 3 shows the mounting head 104 in greater detail according to an embodiment. The mounting head 104 can comprise a plate member having a first surface 110 facing an upper end of the elongate part 102, and a second surface 112 opposite the first surface 110. A thickness T is defined between the first and second surfaces 110, 112. The thickness T can be constant or may vary and is selected to help reinforce the mounting head 104 against undesirable deformation during use and/or movement of the pipe mounting device 100 between the first position and the second position. The mounting head 104 can be made of any suitable material such as metal, plastic having a hardened configuration, or any other suitable material. The mounting head 104 is shown having an incomplete circular configuration but can have any suitable shape and/or configuration.

According to an embodiment, the mounting head 104 includes an outer radial surface defining a periphery of the mounting head 104 and comprising a pair of curved surfaces 114 generally corresponding to a contour of the inner diameter of a pipe or drain pipe, and a pair of linear or truncated surfaces 116 extending between the curved surfaces 114. The curved surfaces 114 are configured to allow the mounting head 104 to interface with and lockingly fit against an inner diameter of a pipe when the pipe mounting device 100 is the second position. The curved surfaces can be the same or different.

The mounting head 104 can have a maximum diameter D defined between the curved surfaces 114 that generally corresponds to the inner diameter of the pipe. In an embodiment, the maximum D can be between about 2 inches and about 2.1 inches (e.g., about 2.08 inches) such that when the first surface 110 or the mounting head 104 is generally normal the inner surface of the pipe, the curved surfaces 114 define working surfaces 118 configured to lockingly engage with the inner diameter of a 2-inch pipe. In an embodiment, the working surfaces 118 can include a first working surface defined along an intersection of the first surface 110 and one of the curved surfaces 114 and a second working surface defined along an intersection of the second surface 112 and the other curved surface 114. According to a variation, the first working surface can push upwardly along the inner wall of the drain pipe while the second working surface pushes downwardly along the inner wall of the drain pipe to selectively lock the mounting head 104 in the drain pipe.

The truncated surfaces 116 are configured to allow the mounting head 104 to move through the inner diameter of the pipe when the pipe mounting device 100 is in the first position. More particularly, when the mounting head 104 is selectively or obliquely positioned (e.g., pitched and/or rotated) relative to being normal to the inner surface of the pipe, the truncated surfaces 116 provide a clearance between the mounting head 104 and the inner surface of the pipe that can permit the mounting head 104 to move through the pipe. For instance, when the mounting head 104 is pitched relative to horizontal or normal inside of the pipe, the mounting head 104 spans a distance shorter than the inner diameter of the pipe, which in turn, allows the mounting head to pass through the pipe. As such, the configuration of the mounting head 104 advantageously allows the mounting head 104 to be repositioned between the first and second positions to both lockingly engage the mounting head 104 with the pipe and freely move the mounting head 104 through the pipe.

According to a variation, a transition between the outer peripheral surface of the mounting head 104 and the first surface 110 and/or the second surface 112 can include a radiused or rounded configuration, helping the mounting head 104 slide or move over the inner diameter or wall of the drain pipe. In other embodiments, a transition between the outer peripheral surface of the mounting head 104 and the first surface 110 and/or the second surface 112 can include a locking feature that helps maintain the mounting head 104 in the second position.

As seen, the connection between the elongate part 102 and the mounting head 104 can be selectively offset a distance from the outer periphery of the mounting head 104. This beneficially provides a clearance between the elongate part 102 and the inner diameter or inner wall of the pipe such that the elongate part can rotate the mounting head 104 about the rotation axis R inside of the pipe between the first position and the second position.

According to a variation, the mounting head 104 includes one or more features to reduce or eliminate damage caused by the mounting head 104 to the inner diameter of the pipe. For instance, the mounting head 104 can define one or more radiused edges 120 connecting the curved surfaces 114 and the truncated surfaces 116. The radiused edges 120 help smooth the transition between the curved surfaces 114 and the truncated surfaces 116, which, in turn, helps reduce the likelihood of pressure points formed on the inner diameter by the mounting head 104. This advantageously helps the mounting head 104 lockingly engage with the inner diameter of the pipe with reduced or little damage to the pipe itself.

Figure 4:
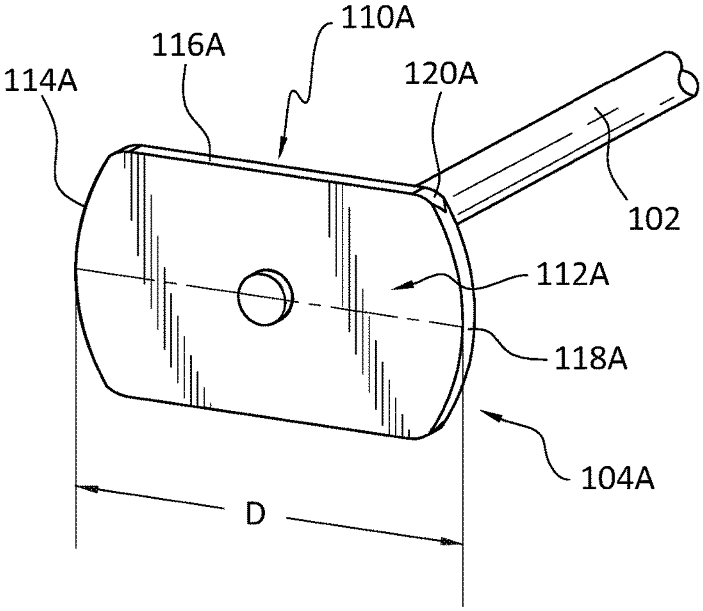
FIG. 4 is a bottom perspective view of a pipe mounting device according to another embodiment.

FIG. 4 illustrates a mounting head 104A according to yet another embodiment. The mounting head 104A is like the mounting head 104 comprising a plate member having a first surface 110A, a second surface 112A, a pair of curved surfaces 114A generally corresponding to a contour of the inner diameter of a pipe, a pair of linear or truncated surfaces 116A extending between the curved surfaces 114A, and one or more radiused edges 120A connecting the curved surfaces 114A and the truncated surfaces 116A.

A maximum diameter D1 of the mounting head 104A between the curved surfaces 114A is greater than the maximum diameter D of the mounting head 104. For instance, the maximum diameter D1 can be between about 3 inches and about 3.2 inches (e.g., about 3.11 inches) such that when the first surface 110A or the mounting head 104A is generally normal or horizontal to the inner surface of a pipe, the curved surfaces 114A define working surfaces 118A configured to lockingly engage with the inner wall or inner diameter of a 3-inch pipe.

As seen, the radius of curvature of the curved surfaces 114A can be greater than the curved surfaces 114, and the truncated surfaces 116A can be greater in length than the truncated surfaces 116. Also, the connection between the mounting head 104A and the elongate part 102 is centrally located within the mounting head 104A, providing a clearance for movement or rotation of the elongate part 102 inside of the pipe.

Figure 5:
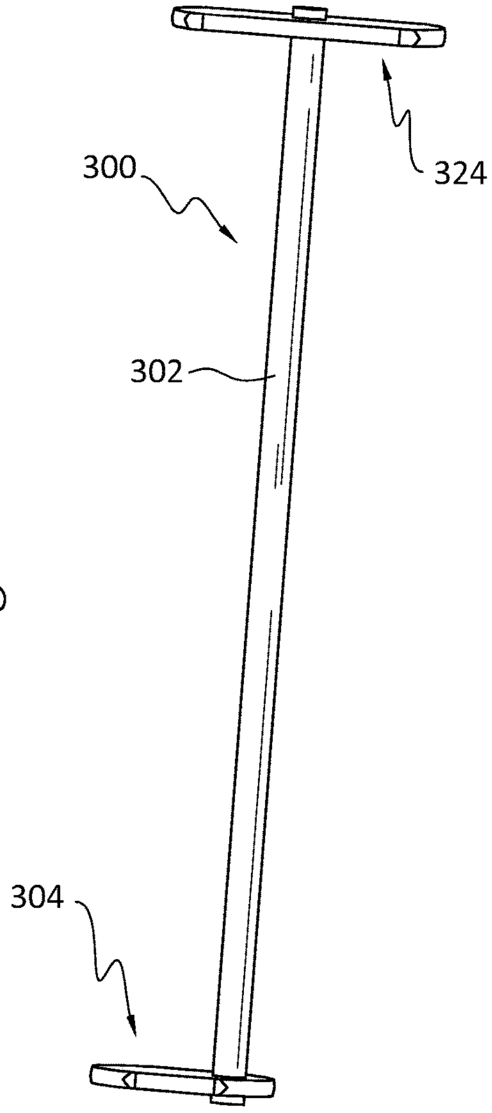
FIG. 5 is a side view of a pipe mounting device according to another embodiment.

FIG. 5 illustrates a pipe mounting system comprising a pipe mounting device 300 according to yet another embodiment. In the illustrated embodiment, the pipe mounting device 300 includes an elongate part 302, a first mounting head 304 head connected to a first end of the elongate part 302, and a second mounting head 324 connected to a second end of the elongate part 302 opposite the first end. As seen, the first and second mounting heads 304, 324 can be different. For instance, the first mounting head 304 can be sized and configured to selectively mount the pipe mounting device 300 within a 2-inch pipe, and the second mounting head 324 can be sized and configured to selectively mount the pipe mounting device 300 within a 3-inch pipe or other sized pipe. This advantageously allows a single pipe mounting device 300 to mount itself within different sized pipes. As discussed above, the mounting heads 304, 324 may be also be arranged to be interchangeable with other mounting heads as needed.

Figure 6:
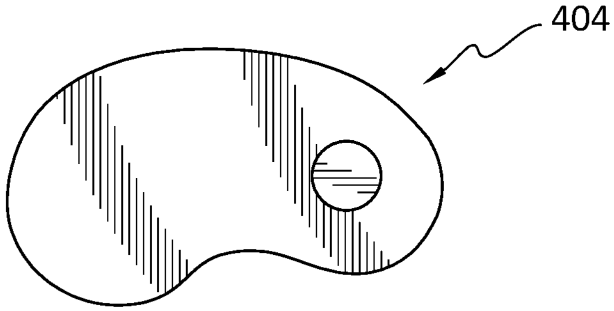
FIG. 6 is a bottom view of a pipe mounting device according to another embodiment.
Figure 7:
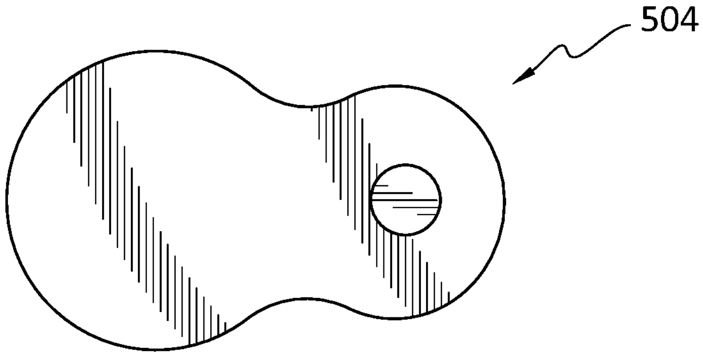
FIG. 7 is a bottom view of a pipe mounting device according to another embodiment.
Figure 8:
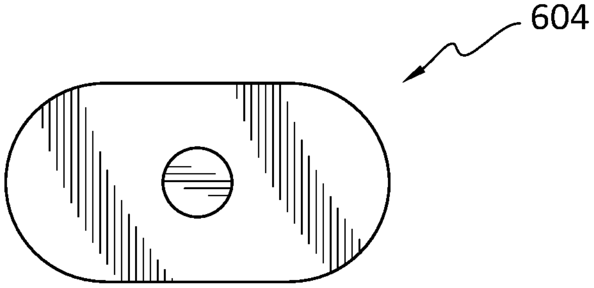
FIG. 8 is a bottom view of a pipe mounting device according to another embodiment.

FIGS. 6-8 illustrate alternative embodiments of the mounting head. FIG. 6 shows a mounting head 404 having a kidney-shaped configuration and a connection between the mounting head 404 and the elongate part that is radially offset from the outer periphery of the mounting head 404. Like other embodiments, the mounting head 404 is sized and configured to move between a first position in which the mounting head 404 can move through a pipe, and a second position in which working edges of the mounting head 404 locking engage with an inner diameter of the pipe.

FIG. 7 shows a mounting head 504 having a peanut shell-shaped configuration and a connection between the mounting head 504 and the elongate part that is radially inserted from the outer periphery of the mounting head 504. Like other embodiments, the mounting head 504 is sized and configured to move between a first position in which the mounting head 504 can move through a pipe, and a second position in which working edges of the mounting head 504 locking engage with an inner diameter of the pipe.

FIG. 8 shows a mounting head 604 having an oval-shaped configuration and a connection between the mounting head 604 and the elongate part that is centrally offset from the outer periphery of the mounting head 604. Like other embodiments, the mounting head 604 is sized and configured to move between a first position in which the mounting head 604 can move through a pipe, and a second position in which working edges of the mounting head 604 lockingly engage with an inner diameter of the pipe. It will be appreciated that in other embodiments, the mounting head can have regular geometric configurations and/or irregular geometric configurations.

Figure 9:
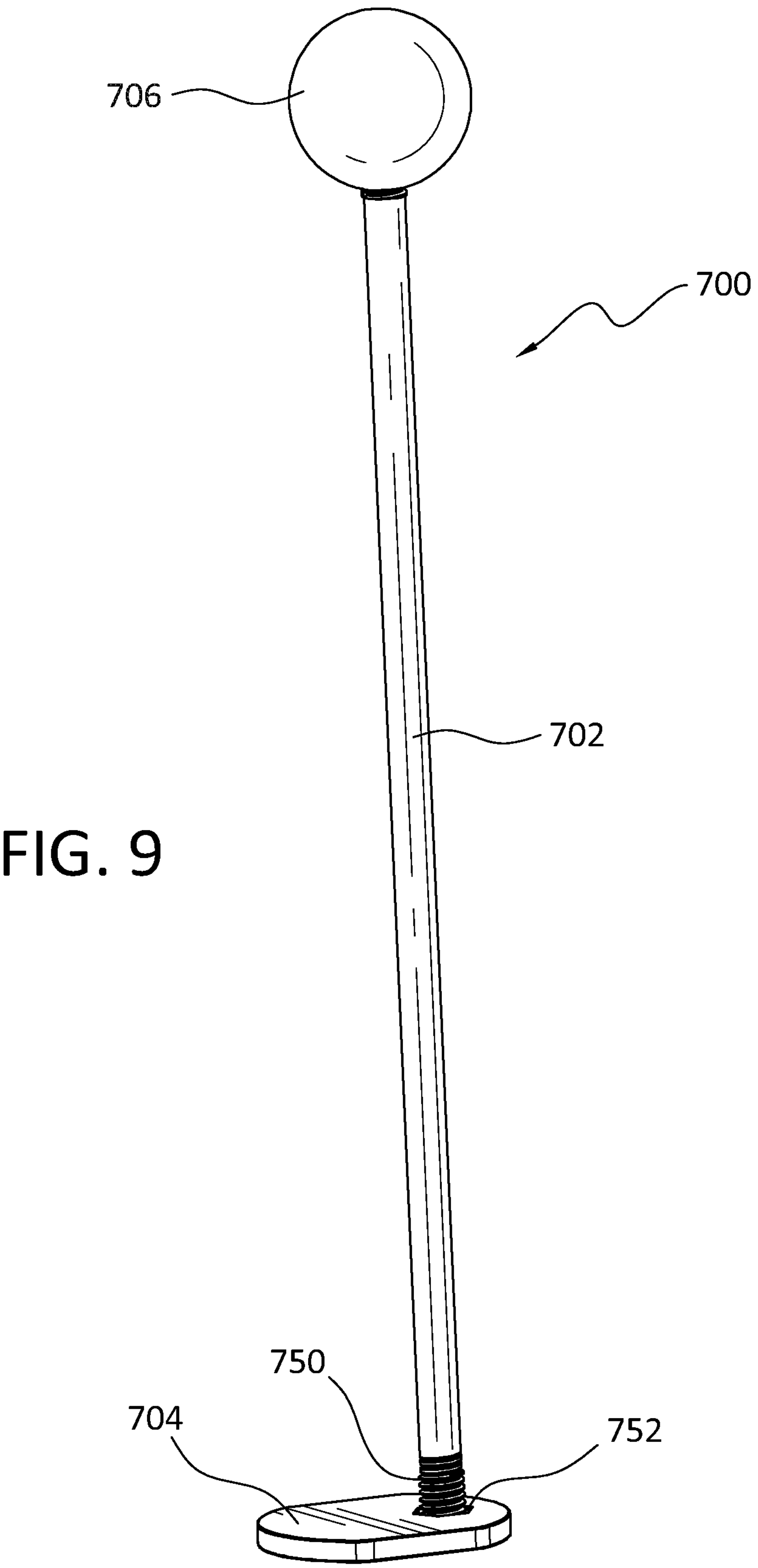
FIG. 9 is a side perspective view of a pipe mounting device according to another embodiment.

FIG. 9 illustrates a pipe mounting system comprising a pipe mounting device 700 according to yet another embodiment. It will be appreciated that the pipe mounting device 700 can have the same or similar features as any of the embodiments described herein. The pipe mounting device 700 includes an elongate part 702 and a mounting head 704 connected at or near a first end of the elongate part 702 and arranged to selectively mount the pipe mounting device 700 to an internal diameter of a pipe, such as a drain pipe. The mounting head 704 is removably attached to the elongate part 702 via a threaded connection. As such, the mounting head 704 can be interchangeable with different mounting heads configured for pipes of different sizes and/or materials. Also, the mounting head 704 can be removed and repaired or replaced as needed.

In an embodiment, the elongate part 702 can include a threaded portion 750 arranged to interface with a threaded opening 752 in the mounting head 704. In other embodiments, the elongate part 702 can include a threaded portion arranged to interface with a threaded fastener 754 (shown in FIG. 10A) connected to an upper side of the mounting head 704. For instance, the threaded fastener 754 can comprise a threaded nut welded onto the mounting head 704, which, in turn, can increase the attachment area between the elongate part 702 and the mounting head 704 and help strengthen the connection between the elongate part 702 and the mounting head 704.

The elongate part 702 is shown as a rod member but can comprise any suitable member. The elongate part 702 has a strength and stiffness configured to resist a bending moment and/or twisting in the elongate part 702. The elongate part 702 can be linear, angled, curved, or combinations thereof. The elongate part 702 and the mounting head 704 can be made of any suitable material. The connection between the elongate part 702 and the mounting head 704 is offset from an outer periphery of the mounting head 704. The provides a clearance between the elongate part 702 and an inner diameter of the pipe, facilitating operation of the pipe mounting device 700 when the pipe mounting device 700 is inserted or installed in a drain or drain pipe.

The mounting head 704 is shown having an incomplete circular configuration but can have any suitable shape and/or configuration. Like in other embodiments, the mounting head 704 is sized and configured to selectively mount the pipe mounting device 700 to the internal diameter of a pipe or pipe fitting. For instance, the pipe mounting device 700 can be movable between a first position in which the mounting head 704 is positionable within and passable through an inner diameter of the pipe, and a second position in which the mounting head 704 lockingly interfaces or engages with the inner diameter of the pipe. The pipe mounting device 700 in the second position allows a user to easily access and set or maintain the position of the pipe, for example, during the attachment of a drain body of a floor drain system to the pipe, which, in turn, facilitates installation of the floor drain system. In an embodiment, rotating and/or tilting the mounting head 704 within the pipe via the elongate part 702 moves the pipe mounting device 700 between the first position and the second position. This streamlined design allows the pipe mounting device 700 to be easily employed in many different applications.

In the illustrated embodiment, a grip portion 706 is connected to the elongate part 702 at or near a second end opposite the first end. The grip portion 706 is shown comprising a knob member, providing an ergonomic shape that allows a user to easily grip the elongate part 702. The knob member is also sized to easily allow a plumbing fixture to be loaded onto the pipe mounting device 700 over the knob member. This beneficially reduces the overall profile of the pipe mounting device 700 and facilitates use of the pipe mounting device 700.

An exemplary implementation of the pipe mounting device 700 according to an embodiment will now be described in reference to FIGS. 10A-10H. A step 801 can include positioning the pipe mounting device 700 within a pipe end 70 as shown in FIG. 10A. This can include positioning the pipe mounting device 700 within the pipe end 70 via a cutout 72 formed in a subfloor 74 and a pipe fitting 76 attached to the pipe end 70. In an embodiment, the pipe mounting device 700 is positioned within the pipe end 70 in the first portion in which the mounting head 704 can move a distance through an opening of the pipe end 70. According to a variation, the mounting head 704 is obliquely oriented relative to a longitudinal axis B of the pipe end 70 in the first position.

Figure 10B:
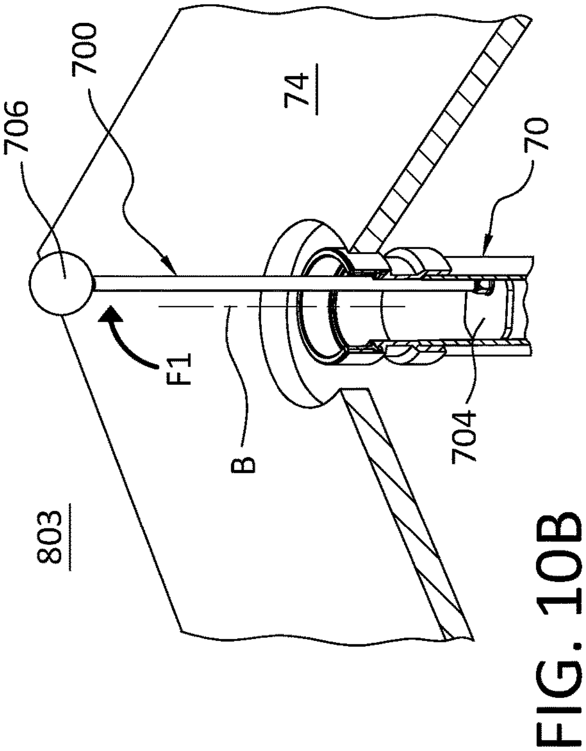
FIG. 10A-10H is an overview of the steps in an embodiment of a plumbing fixture installation method using the pipe mounting device in FIG. 9.
Figure 10A:
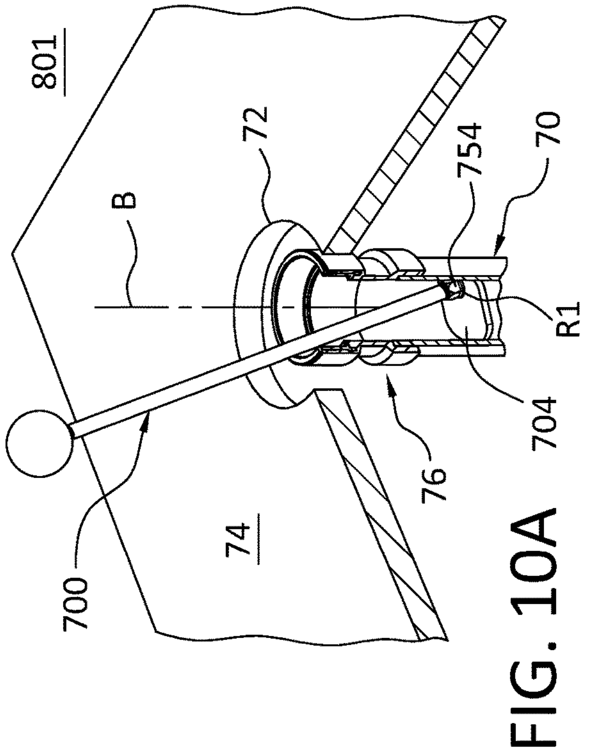

A step 803 can include moving the pipe mounting device 700 from the first position to the second position with the pipe mounting device 700 positioned inside the pipe end 70 as shown in FIG. 10B. Step 803 can include a user comfortably gripping the grip portion 706 to move the pipe mounting device 700 from the first position to the second position. In the second position, the mounting head 704 lockingly engages with the inner diameter of the pipe end 70 such that the pipe mounting device 700 is selectively locked or mounted together with the pipe end 70. In an embodiment, the mounting head 704 is oriented substantially normal to the longitudinal axis B of the pipe end 70 when the pipe mounting device 700 is in the second position.

Step 803 can include applying a force F1 to the grip portion 706 or toward the second end of the elongate part 702 above the subfloor 74, which, in turn, rotates the elongate part 702 and the mounting head 704 in the first direction (e.g., clockwise) about a rotation axis R1 from the first position to the second position. This forces one or more working surfaces on the mounting head 704 into locking engagement with the inner diameter of the pipe end 70. Because the elongate part 702 defines a moment arm and provides the user a point of control above the subfloor 74, it provides both a mechanical and use advantage, requiring less strength or dexterity to move the pipe mounting device 700 between the first position and the second position. In the illustrated embodiment, the elongate part 702 is offset from a center of the pipe end 70 when the pipe mounting device 700 is in the second position.

Figure 10D:
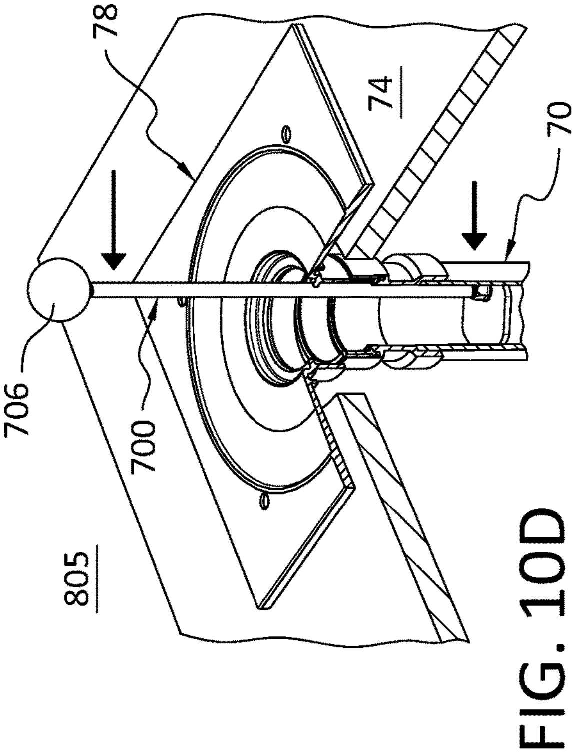
Figure 10C:
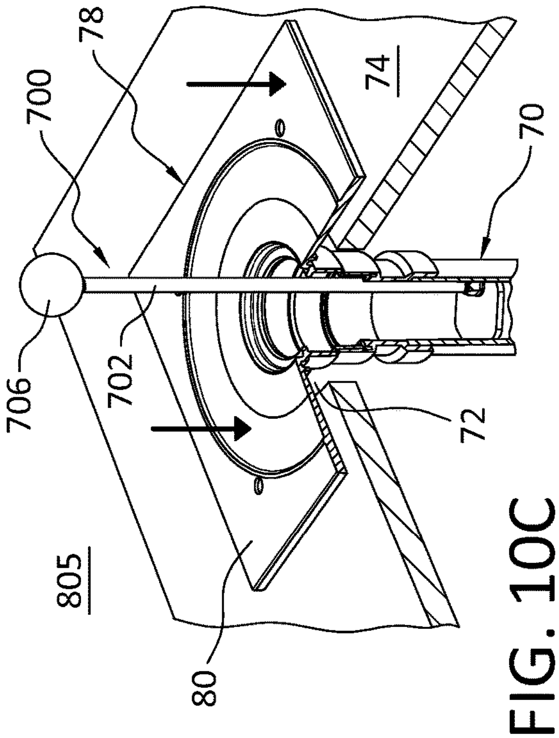

A step 805 includes attaching a plumbing fixture to the pipe end 70 as shown in FIGS. 10C-10F. The plumbing fixture is shown comprising a drain body 78 with a flange 80 but can comprise any suitable plumbing fixture. Step 805 can include positioning the drain body 78 in the cutout 72 as shown in FIG. 10C. Step 805 can include loading the drain body 78 onto the pipe mounting device 700 and positioning it in the cutout 72. For instance, step 805 can include loading the drain body 78 onto and over the grip portion 706 and moving the drain body 78 along the elongate part 702 until it can fit in the cutout 72. In an embodiment, the flange 80 supports the drain body 78 in the cutout 72 on the subfloor 74 and provides an attachment surface between the drain body 78 and the subfloor 74.

Step 805 can include adjusting the lateral position of the pipe end 70 below the subfloor 74 in relation to the drain body 78 using the pipe mounting device 700 shown in FIG. 10D. For instance, step 805 can include a user grasping the grip portion 706 to move the pipe mounting device 700 in the second position and the pipe end 70 laterally relative to the drain body 78.

Figure 10E:
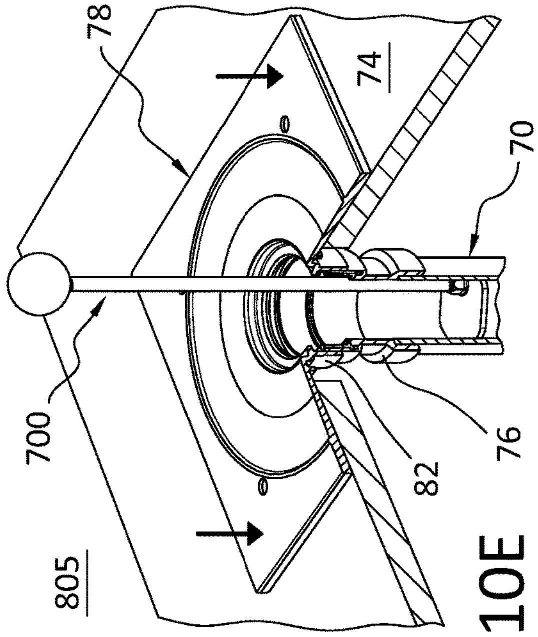

Step 805 can include attaching the drain body 78 to the fitting 76 as shown in FIG. 10E. For instance, step 805 can include applying an adhesive between a lower portion 82 of the drain body 78 and an upper portion of the fitting 76 and forcing the drain body 78 downward on the fitting 76 toward the subfloor 74. The lower portion 82 of the drain body 78 is shown interfacing with an outer surface of the fitting 76 but in other embodiments, the lower portion 82 of the drain body 78 can be configured to interface with an inner surface of the fitting 76.

Figure 10F:
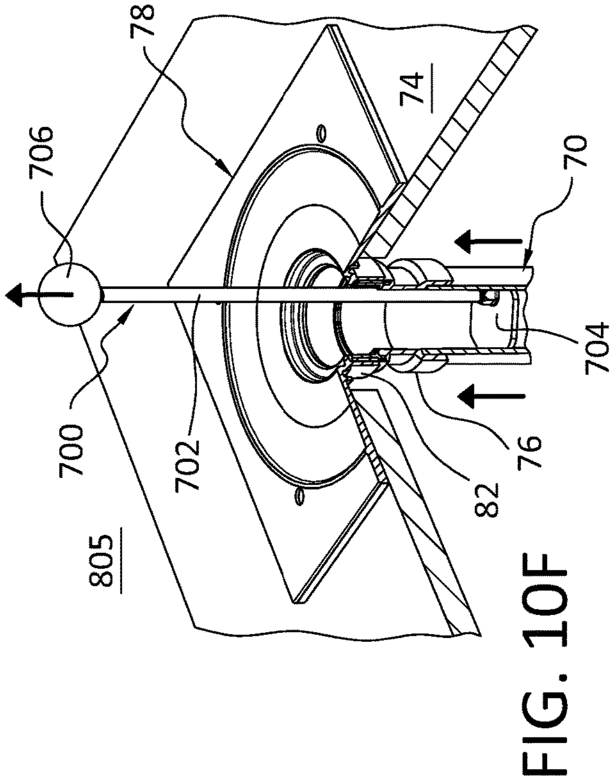

Step 805 can also include adjusting the vertical position of the pipe end 70 below the subfloor 74 in relation to the drain body 78 using the pipe mounting device 700 as shown in FIG. 10F. For example, step 805 can include forcing the pipe end 70 upward into the fitting 76 by pulling upward on the pipe mounting device 700 in the second position using the grip portion 706 to ensure the fitting 76 is properly inserted in the lower portion 82 of the drain body 78. More particularly, a user can grasp and pull upward on the grip portion 706, which, in turn, forces the elongate part 702 and the mounting head 704 inside the pipe end 70 upward. Because the mounting head 704 is in locking engagement with the inner diameter of the pipe end 70 in the second position, the upward movement of the mounting head 704 forces the pipe end 70 and the fitting 76 upward into the lower portion 82 of the drain body 78, ensuring a proper seal between the drain body 78 and the fitting 76.

In other embodiments, a user can manipulate or use the pipe mounting device 700 to maintain a position of the drain pipe 10 below the subfloor 74 and the drain body 78 can be moved or forced downwardly onto the pipe end 70 against the resistance provided by the pipe mounting device 700. This advantageously allows the pipe mounting device 700 to limit or eliminate undesirable downward movement of the pipe end 70 below the subfloor 74 during a floor drain installation. While the drain body 78 is described as being loaded onto the pipe mounting device 700 after the pipe mounting device 700 is positioned in the pipe end 70, in other embodiments, the drain body 78 can be positioned in the cutout 72 on the subfloor 74 before the pipe mounting device 700 is positioned in the pipe end 70. For instance, the pipe mounting device 700 can be fed through the drain body 78 into the pipe end 70. In other embodiments, the drain body 78 can be loaded onto the pipe mounting device 700 before the pipe mounting device is positioned in the pipe end 70.

It will be appreciated that the drain body 78 can be sealingly attached to the drain pipe 10 in any suitable manner. For example, the drain body 18 can be attached to the drain pipe 10 via a compression fitting.

Figure 10G:
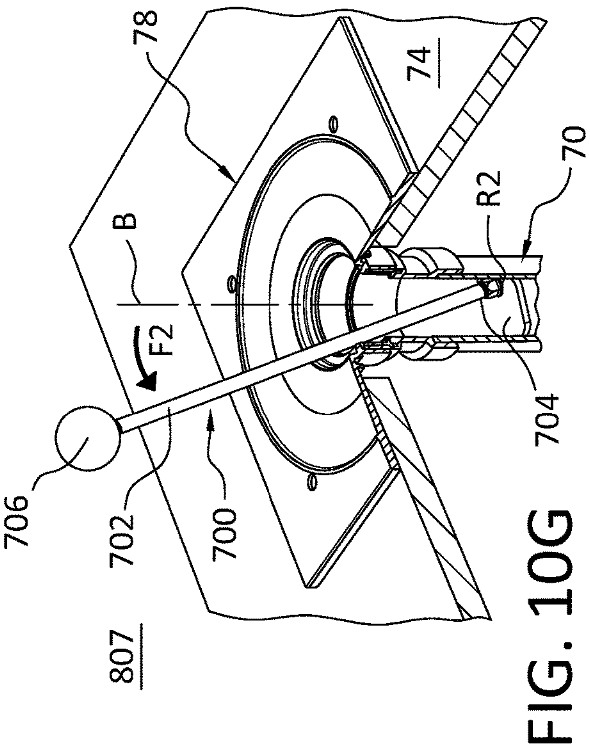
Figure 10H:
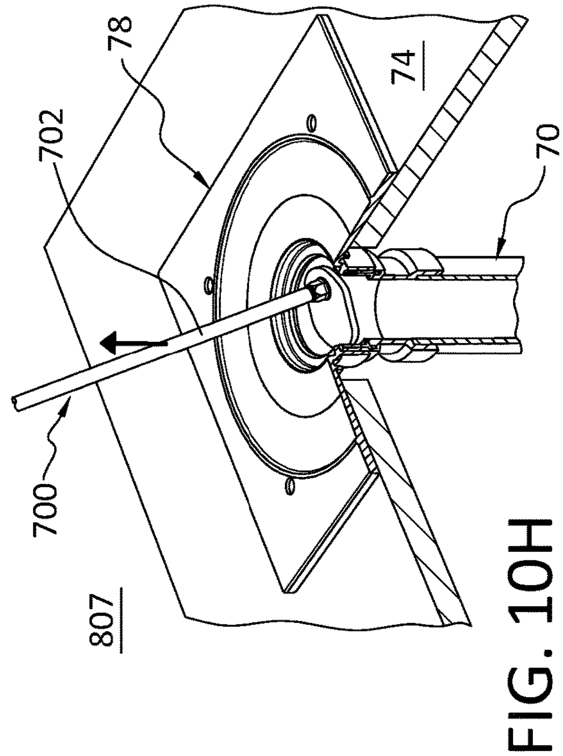

A step 807 can include removing the pipe mounting device 700 from the pipe end 70 after the drain body 78 is attached to the pipe end 70 as shown in FIGS. 10G and 10H. In an embodiment, step 807 includes moving the pipe mounting device 700 from the second position toward the first position, and withdrawing the pipe mounting device 700 from the pipe end 70 after the drain body 78 is attached to the pipe end 70. For instance, a force F2 can be applied to the grip portion 706 that rotates the elongate part 702 and the mounting head 704 in a second direction (e.g., counter-clockwise) opposite the first direction about the rotation axis R2 from the second position toward the first position, which, in turn, forces the one or more working surfaces on the mounting head 704 out of locking engagement with the inner diameter of the pipe end 70 as shown in FIG. 10G. With the pipe mounting device 700 in or near the first position, the mounting head 704 of the pipe mounting device 700 can be freely removed or retracted from the pipe end 70 as shown in FIG. 10H, removing the pipe mounting device 700 from the pipe end 70. Because the drain body 78 is attached to the subfloor 74, the drain body 78 limits or eliminates undesirable movement of the pipe end 70 after removal of the pipe mounting device 700 as shown in FIG. 10H. The pipe mounting device 700 thus helps provide streamlined and improved installation of a drain system or other plumbing fixture.

The various aspects and embodiments disclosed herein are for purposes of illustration and are not intended to be limiting. For instance, while the subfloor is described as a wood subfloor, it will be appreciated that in other embodiments the pipe mounting device can be used with a cutout in concrete subfloor, a subfloor constructed of prefabricated panels, or other subfloor arrangement. In other embodiments, the mounting head can be something other than a plate member.

Additionally, the words "including," "having," and variants thereof (e.g., "includes" and "has") as used herein, including the claims, shall be open-ended and have the same meaning as the word "comprising" and variants thereof (e.g., "comprise" and "comprises").

The invention claimed is:

1. A pipe mounting device comprising:

an elongate part having a first end and a second end; and a mounting head sized and configured for positioning within a pipe end comprising a plastic material, the mounting head oriented normal to the elongate part and attached to the first end at a position offset from a center axis of the mounting head oriented parallel to the elongate part such that tilting the elongate part when the mounting head is positioned within the pipe end moves the pipe mounting device between a first position in which the mounting head is passable through an inner diameter of the pipe end along a length, and a second position in which the mounting head lockingly engages the inner diameter of the pipe end to control a position of the pipe end, wherein the mounting head comprises a pair of curved surfaces which each form an edge on a radius of the curve connecting to side truncated surfaces which have a recessed edge, the pair of curved surfaces sized and contoured to interface with and lockingly fit against the inner diameter of the pipe end when the pipe mounting device is in the second position, each of the pair of curved surfaces curving in a horizontal plane oriented normal to the elongate part, wherein the mounting head defines a maximum diameter between the curved surfaces and is symmetrical about the maximum diameter;

wherein the mounting head comprises a material configured to have a hardness greater than the plastic material of the pipe end such that the pipe end flexes to accommodate the mounting head in the second position and to form a press fit between the mounting head and the pipe end in the second position without damaging the pipe end, wherein the press fit between the mounting head and the flexed pipe end selectively locks the pipe mounting device in the second position with the mounting head normal to a longitudinal axis of the pipe end and the elongate part parallel to the longitudinal axis of the pipe end, wherein the center axis of the mounting head crosses a midpoint of the maximum diameter, wherein a width of the mounting head defined in the horizontal plane and oriented normal to the maximum diameter is greater at each of the pair of curved surfaces than at a middle portion of the mounting head between the pair of curved surfaces.

2. The pipe mounting device of claim 1, wherein tilting or pitching the mounting head within the pipe end moves the pipe mounting device between the first position and the second position.

3. The pipe mounting device of claim 1, wherein the maximum diameter is between about 2 inches and about 2.1 inches.

4. The pipe mounting device of claim 1, wherein the maximum diameter is between about 3 inches and about 3.2 inches.

5. The pipe mounting device of claim 1, wherein the mounting head comprises a plate member.

6. The pipe mounting device of claim 1, wherein a connection between the mounting head and the elongate part is offset a distance from an outer periphery of the mounting head.

7. The pipe mounting device of claim 1, wherein the mounting head is formed of a metal material.

8. The pipe mounting device of claim 1, wherein the elongate part defines a moment arm to move the pipe mounting device between the first position and the second position.

9. The pipe mounting device of claim 1, wherein the mounting head comprises a first mounting head, and a second mounting head is attached to a second end of the elongate part opposite the first end such that the pipe mounting device is mountable within the pipe end via the first end or the second end.

10. The pipe mounting device of claim 1, wherein the mounting head comprises an oval-shaped configuration.

11. The pipe mounting device of claim 1, further comprising a grip portion attached to a second end of the elongate part opposite the first end, the grip portion configured to facilitate movement of the pipe mounting device between the first position and the second position.

12. A pipe mounting device comprising:

an elongate part including a first end and a second end opposite the first end;

a mounting head sized and configured for positioning within a pipe end comprising a plastic material, the mounting head oriented normal to the elongate part and attached to the first end at a position offset from a center of the mounting head such that tilting the elongate part when the mounting head is positioned within the pipe end moves the mounting head between a first position in which the mounting head is passable through an inner diameter of the pipe end along a length, and a second position in which the mounting head lockingly engages the inner diameter of the pipe end to control a position of the pipe end below a subfloor, wherein the mounting head includes a first curved surface and a second curved surface each forming an edge on a radius of a curve connecting to side truncated surfaces which have a recessed edge and each curving in a horizontal plane oriented normal to the elongate part and sized and contoured to interface with and lockingly fit against the inner diameter of the pipe end when the pipe mounting device is in the second position, the first curved surface connected at its ends to the second curved surface by the side truncated surfaces, wherein the mounting head comprises a material configured to have a hardness greater than the plastic material of the pipe end such that the pipe end flexes to accommodate the mounting head in the second position and to form a press fit between the mounting head and the pipe end in the second position without damaging the pipe end, wherein the press fit between the mounting head and the flexed pipe end selectively locks the pipe mounting device in the second position with the mounting head normal to a longitudinal axis of the pipe end and the elongate part parallel to the longitudinal axis of the pipe end; and a grip portion attached to the second end, the grip portion configured to facilitate movement of the pipe mounting device between the first position and the second position and passing through a plumbing fixture attachable to the pipe end, wherein a width of the mounting head defined in the horizontal plane oriented normal to a maximum diameter between the first curved surface and the second curved surface is greater at the first curved surface and at the second curved surface than at a middle portion of the mounting head between the first curved surface and the second curved surface, wherein the mounting head is symmetrical across a vertical plane perpendicular to the horizontal plane and projecting from the maximum diameter.

13. The pipe mounting device of claim 12, wherein the grip portion comprises a knob member.

14. A pipe mounting device comprising:

an elongate part including a first end and a second end opposite the first end;

a mounting head sized and configured for positioning within a pipe end comprising a plastic material, the mounting head oriented normal to the elongate part and attached to the first end such that tilting the elongate part when the mounting head is positioned within the pipe end moves the mounting head between a first position in which the mounting head is passable through an inner diameter of the pipe end along a length, and a second position in which the mounting head lockingly engages the inner diameter of the pipe end to control a position of the pipe end below a subfloor, wherein the mounting head includes at least one curved surface contoured to generally correspond to the inner diameter of the pipe end, the at least one curved surface curving in a horizontal plane normal to the elongate part and forming an edge on a radius of the curve connecting to a side truncated surface which has a recessed edge, wherein the mounting head comprises a material configured to have a hardness greater than the plastic material of the pipe end such that the pipe end flexes to accommodate the mounting head in the second position and to form a press fit between the mounting head and the pipe end in the second position without damaging the pipe end, wherein the press fit between the mounting head and the flexed pipe end selectively locks the pipe mounting device in the second position with the mounting head normal to a longitudinal axis of the pipe end and the elongate part parallel to the longitudinal axis of the pipe end, wherein the mounting head has a maximum diameter of between about 2 inches and about 2.1 inches, or between about 3 inches and about 3.2 inches; and wherein a longitudinal axis of the elongate part intersects the mounting head at a position offset from a center of the mounting head, wherein a width of the mounting head defined in the horizontal plane and oriented normal to the maximum diameter is greater at the at least one curved surface than at a middle portion of the mounting head between the at least one curved surface and the elongate part, wherein the mounting head is symmetrical across a vertical plane perpendicular to the horizontal plane and projecting from the maximum diameter.

15. The pipe mounting device of claim 14, wherein the mounting head comprises a first mounting head, and a second mounting head is attached to a second end of the elongate part opposite the first end such that the pipe mounting device is mountable within the pipe end via the first end or the second end, wherein the second mounting head has a maximum diameter that is different from the maximum diameter of the first mounting head.

* * * * *